United States Patent Office 2,987,562
Patented June 6, 1961

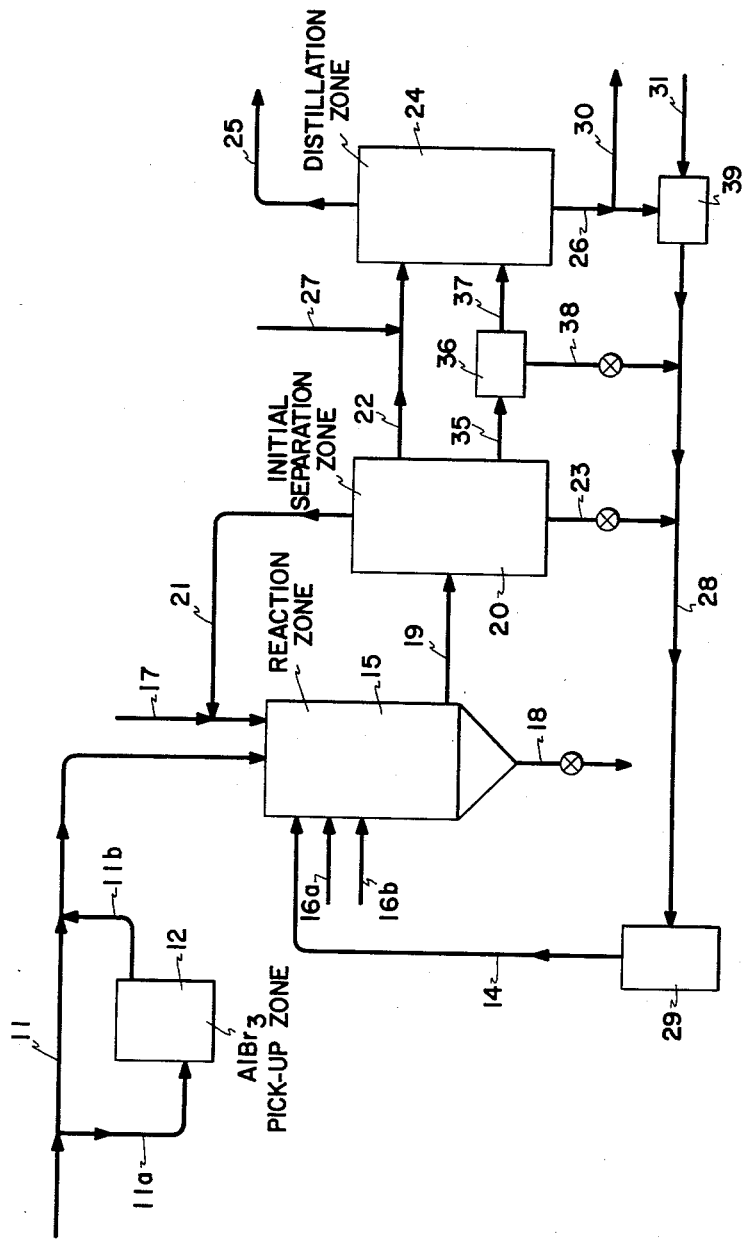

2,987,562
CATALYST RECOVERY IN HYDROCARBON REACTIONS PROMOTED WITH ALUMINUM BROMIDE
Ronald C. Hoke, Berkeley Heights, John E. Idenden, Belleville, and Marvin B. Glaser, Plainfield, N.J., assignors to Esso Research and Engineering Company, a corporation of Delaware
Filed May 18, 1959, Ser. No. 814,098
7 Claims. (Cl. 260—683.53)

This invention relates to improvements in the recovery and re-use of aluminum halides that have been employed as catalysts in hydrocarbon conversion reactions. In particular, the invention concerns recovery of aluminum bromide from paraffin hydrocarbon isomerization and alkylation reactions.

The demands made upon the petroleum industry to furnish large quantities of motor fuels of high antiknock rating in order to power modern high compression automotive engines have led to a renewed interest in isomerization and alkylation reactions.

It is well known to effect the isomerization of normal paraffin hydrocarbons of from 4 to 7 carbon atoms into the corresponding branched chain homologs by the use of Friedel-Crafts catalysts, particularly the metal halides such as aluminum chloride or aluminum bromide. Most desirably, certain promoters such as hydrogen chloride, hydrogen bromide or boron trifluoride are employed in conjunction with the metal halides. When isomerizing light naphthas it is desirable to conduct the isomerization reaction at relatively low temperatures in order to favor the formation of those branched chain isomers that have the highest antiknock ratings. Aluminum bromide has been found to be more active than the chloride at isomerization temperatures in the range of from about 50° to about 150° F., in which range the equilibrium of the reaction favors the production of the most desirable isomers. The preferred temperature range is from about 70° to about 120° F. The activity of the aluminum bromide is greatly enhanced if it is associated with a metal oxide support such as alumina, silica gel, calcined bauxite, ferric oxide and the like. Certain liquid complexes such as those formed between aluminum bromide and chlorine or bromine, between aluminum bromide and inorganic acids such as phosphoric acid, and between aluminum bromide and alkyl halides, alcohols, ethers, or ketones of up to about 8 carbon atoms are also very active isomerization catalysts.

It has recently been found that by the use of a promoted aluminum bromide catalyst, butanes and/or pentanes can be reacted directly with higher paraffin hydrocarbons of from 6 to 18 carbon atoms to give good yields of $C_5$ to $C_7$ branched chain saturated paraffin hydrocarbons of high octane rating. The conditions employed are those that favor simultaneous cracking, isomerization and alkylation reactions. The quantity of the butane or pentane in the reaction is considerably greater than the quantity of the higher paraffin hydrocarbon and there is a net consumption of the lower hydrocarbon. Most desirably, conditions are such that the products of the reaction predominate in $C_5$ and $C_6$ paraffin isomers with smaller proportions of $C_7$ isomers. Since there is a net consumption of the lower boiling and higher boiling reactants and a net production of intermediate hydrocarbons, in effect, one paraffin hydrocarbon is alkylated with another paraffin hydrocarbon. Thus, the process may be termed a paraffin alkylation process. Aluminum bromide is also known to be an active catalyst for the alkylation of isoparaffin hydrocarbons with olefins to produce branched chain hydrocarbons that are useful components of motor fuels.

One of the disadvantages accompanying the use of aluminum bromide in hydrocarbon reactions of the types outlined above is that it is appreciably soluble in the reaction products and may be present to the extent of 2 to 5 wt. percent or more in the effluent from a commercial reactor. Furthermore it is essential that soluble aluminum bromide be present in the reacting hydrocarbons, over and above the amount adsorbed on the support or tied up in the catalyst complex, depending on the type of catalyst system used, in order for the reaction to proceed properly. Because of this, practical methods must be available for the recovery of the aluminum bromide so that it can be re-used in the process. The recovery methods employed must be such that they will not cause degradation of the reaction products or of the catalyst. Separation of the hydrocarbon products from the aluminum bromide catalyst by simple distillation is a desirable method for catalyst recovery. However, care must be exercised when using such a recovery method because of the tendency for the products to undergo degradation and for sludge formation to occur in the distillation bottoms containing the aluminum bromide catalyst. Also, sludge formation must be avoided during the time that the recovered catalyst is held in storage or in the transfer lines before it is used again in the process. Sludge is obviously undesirable because it consumes catalyst and is therefore expensive.

It is one object of the present invention to furnish a procedure for effectively recovering aluminum bromide from the products of hydrocarbon conversion reactions, such as isomerization and alkylation, so that the catalyst can be re-used in the process. It is a further object of the invention to provide a procedure for preventing the degradation of the aluminum bromide concentrate after it has been recovered from the reaction products by distillation.

In accordance with the present invention, the degradation of aluminum bromide catalyst recovered by distillation is prevented by immediately quenching the concentrated aluminum bromide bottoms with normal or isobutane, preferably the latter. This prevents catalyst degradation and also minimizes corrosion problems, prevents the plugging of process lines and pumps and aids in the general mechanical operability of the recovery step.

The nature of the invention and the objects to be accomplished will be more readily understood when reference is made to the accompanying drawing in which the single figure is a schematic flow diagram that illustrates the process.

The process will be described with particular reference to a paraffin alkylation reaction wherein isobutane enters into reaction with a higher paraffin hydrocarbon of from 6 to 18 carbon atoms. Referring now to the drawing, a suitable butane feed stream containing a major proportion of isobutane is conducted into reaction zone 15 by means of line 11. Reaction zone 15 contains aluminum bromide associated with a suitable metal oxide support positioned in one or more beds. Among the supports that are preferred are calcined bauxite, silica gel and gamma alumina. In place of aluminum bromide on a solid support, a catalyst may be used comprising a liquid complex, specific reference to which will be made later. Preferably the support is saturated with aluminum bromide and additional aluminum bromide is present in solution in the reacting hydrocarbons. Since some of the aluminum bromide will leave the reaction zone in solution in the hydrocarbons, it is necessary to add make-up aluminum bromide. Accordingly, a portion of the isobutane feed stream is diverted through line 11a into a vessel 12 containing a body of aluminum bromide. Some of this aluminum bromide will dissolve in the diverted stream and the solution is then returned to line 11 by means of line 11b.

The higher paraffin hydrocarbon that enters into the reaction, which for example may be a heavy naphtha cut containing from 5 to 15% naphthene hydrocarbons, is also conducted into reaction zone 15. Preferably, the heavier hydrocarbon feed stream is introduced into the reaction zone at a plurality of spaced points such as 16a and 16b in order that there will be as high a ratio as possible of isobutane to the higher boiling paraffin hydrocarbons in any particular section of the reaction zone.

In addition to the aluminum bromide entering reaction zone 15 in the form of a solution in the isobutane reactant, some aluminum bromide will also enter as a concentrated stream of recovered catalyst via line 14. The total amount of aluminum bromide in the hydrocarbons entering reaction zone 15 will amount to from about 0.2 to about 5% by weight of the hydrocarbons in the reaction zone. Preferably the concentration of aluminum bromide in the reaction zone over and above the amount of aluminum bromide adsorbed on the support is in the range of from about 0.5 to 2% by weight of the reacting hydrocarbons.

It is desirable to employ an auxiliary promoter which is preferably a hydrogen halide, such as hydrogen bromide. The promoter is introduced into the reaction zone by means of line 17 and is preferably employed in the concentration range of from about 0.5 to about 5% by weight based on the total hydrocarbon feed.

Hydrocarbon feed rates may vary from about 0.2 to about 2 v./hr./v. Reaction temperatures of from about 50° to about 140° F. are used and the pressure is sufficiently high to keep the reacting hydrocarbons in the liquid phase. Conditions in the reaction zone are preferably such that no sludge formation occurs. If however, some sludge should form, it may be removed from the reaction zone through line 18.

The reaction product leaves zone 15 through line 19 and is conducted into an initial separation zone 20 wherein conditions are maintained such that light materials including unreacted isobutane and hydrogen halide promoter may be removed overhead and recycled to the reaction zone by means of line 21. The heavier products including $C_5$ hydrocarbons, higher boiling materials and dissolved aluminum bromide are conducted by means of line 22 into a product separation zone 24.

Conditions maintained in distillation zone or products separation zone 24 are such as to distill reaction products at least as high boiling as 6-carbon-atom paraffin hydrocarbons overhead while leaving heavier hydrocarbons as for example normal heptane and higher, as well as certain naphthene hydrocarbons in the distillation bottoms along with the aluminum bromide. Preferably, zone 24 is maintained as a flash distillation zone so that the distillation can be conducted during as short an interval as possible with residence times of no more than 5 minutes and preferably of less than 1 minute. While the naphthenes naturally occurring in the feed stocks may inhibit sludging to some extent, additional naphthenes may be conducted into the distillation zone through line 27 when such are needed to minimize degradation. Zone 24 may also be conducted as a vacuum distillation zone to minimize sludging.

The bottoms from zone 24 are removed through line 26 and ordinarily are recycled to the reaction zone since they contain aluminum bromide which may be used as catalyst in the reaction. To prevent build-up of naphthenes in the system a portion of the bottoms may be bled off from line 26 through line 30. If the residence times in recycle lines 28 and 14 are relatively short, the problem of sludge formation during the transfer of the bottoms back to the reaction zone may not arise. However, in many cases it is advisable to provide a surge zone such as zone 29 in which the recycle catalyst may be held for some period before it is again used, as for example during a temporary shutdown to correct a minor difficulty in the operation of the process. Also, in some installations the recycle lines 28 and 14 may be unduly long so that there will be considerable effective holding times before the catalyst is re-used. To prevent sludging in the recycle lines and in the surge zone when one is used, the present invention provides for immediate quenching of the bottoms as they leave the distillation zone through line 26. This is accomplished by conducting the bottoms into quench 39, which is positioned as close to line 26 as possible, and injecting into the bottoms a considerable quantity of a butane, preferably isobutane. It is preferred that at least an equal volume of the butane be added to the bottoms or that sufficient of the butane or isobutane be added to cool the resultant mixture from its original temperature of say 250°–400° F. down to a temperature no higher than about 150° F. Means may be provided to effect a portion of this cooling by autorefrigeration. There is no critical upper limit on the amount of quenching medium, e.g. isobutane, that is added, but this will, of course, be governed by practical considerations such as the amount of isobutane used in the reaction zone and, just as importantly, the extra cost factors involved in circulating more isobutane than necessary in this part of the system.

Quench zone 39 is preferably provided with suitable means for efficient mixing of the bottoms with the butane, such as mechanical stirrers, pumps, baffles, etc. Since the quenching action provides much faster cooling of the bottoms than can be obtained with conventional heat exchangers, the higher temperatures that promote sludge formation will prevail for much shorter periods of time. Furthermore the direct quench eliminates the heat transfer surface fouling problem presented by use of conventional heat exchangers. Still another advantage of the quench zone is that it provides additional surge capacity and hence better process control.

The process is applicable not only to a paraffin alkylation reaction but also to isomerization reactions since it has been found that an isomerization reaction involving paraffin hydrocarbons of from 5 to 7 carbon atoms can be improved by the addition of from 25 to 100 volume percent of isobutane. Thus, in an isomerization reaction, sufficient isobutane can be added to quench zone 39 to provide the required proportion in the isomerization zone. This added isobutane serves to inhibit cracking during the isomerization reaction.

For isomerization reactions it is preferred that the feed be low in aromatic hydrocarbons and preferably that it contain no more than about 0.1% of such material. If the feed stock is being used in a paraffin alkylation reaction, it should be essentially free of aromatic hydrocarbons and no more than about 0.02% of such material should be present based on feed. Naphthenic hydrocarbons may be tolerated in the feed stock up to about 20 vol. percent in the case of paraffin alkylation reactions and may be present in somewhat higher concentrations in the case of an isomerization reaction. To remove aromatic hydrocarbons from the feed stock conventional techniques may be employed. These include solvent extraction, hydrogenation, acid treating and the like, as well as contacting with selective adsorbents such as molecular sieve zeolites.

The reaction has been particularly described with reference to the use of a supported aluminum bromide catalyst. To prepare the supported catalyst at the start of the process, the support may be saturated with aluminum bromide and then placed in the reaction zone, or, alternatively, the support may be placed in the reaction zone and then saturated with aluminum bromide carried in with a portion of the feed. Another method of preparation is to mix the aluminum halide with the support and to heat the mixture to effect impregnation. If desired, loosely held in aluminum halide may be removed from the catalyst mass by heating the mass and passing through it a gas such as carbon dioxide, methane, hydrogen or nitrogen.

Alternatively, the support may be impregnated by dissolving the aluminum halide in a suitable solvent such as ethylene dichloride or dioxane, for example, and the porous carrier impregnated with this solution, followed by heating to remove the solvent and loosely held aluminum halide. Still another alternative is to employ a powdered support or promoter, mix the aluminum halide with it, and compress the mixture into pellets.

Although the process as described in conjunction with the drawing contemplates downflow of the stream through the catalyst bed, which is preferred, upflow can also be used. Also in place of a fixed bed process, a moving bed of catalyst could be used. Alternatively, a slurry type of operation could be employed wherein a suspension of catalyst is maintained in the reacting hydrocarbons, the slurry being stirred in the reactor with suitable mechanical stirring means or recirculated through the reactor by pumping means. Where slurry operation is used, the slurry is removed from the reactor at the end of the reaction period, in the case of batch operation, or as a fraction of the circulating stream in the case of continuous operation, and sent to suitable separation equipment to separate the catalyst from the hydrocarbons. The separation equipment may comprise a simple settling tank, a centrifuge, or a filter, for example, or suitable combinations of such means.

It is also possible to operate the process with a liquid catalyst complex in place of the solid supported system described. In such a case, reaction zone 15 is preferably equipped with agitation means such as mechanical stirrers. A suitable liquid catalyst complex comprises aluminum bromide and chlorine or bromine, as for example a mixture of 100 parts by weight of $AlBr_3$ and from 25 to 75 parts by weight of bromine. The reaction product leaving zone 15 will carry with it some of the liquid catalyst as a separate phase which will settle out in zone 20 and can be recycled to the reaction zone via lines 23 and 28. The products may be conducted by means of line 35 into a second separation zone 36, if necessary, for further separation of liquid catalyst from the hydrocarbons. Zone 36 may comprise a centrifuge, for example. Separated catalyst in zone 36 is recycled to the reaction zone via lines 38 and 28, while the product, which is now essentially free of catalyst complex but still contains dissolved $AlBr_3$, is sent via line 37 to the product separation zone 24 and handled as previously described. Other catalyst complexes that may be used include an ethyl bromide-aluminum bromide complex in which the ratio of alkyl bromide to $AlBr_3$ is in the range of 1 to 1.5 moles per mole, a heptyl chloride-$AlBr_3$ complex in about a 1 to 1 mole ratio, and a complex prepared from dimethyl ether and $AlBr_3$ in the mole ratio range of about 0.3 to 0.65 mole of the ether and 1 mole of $AlBr_3$.

As previously stated, the processes to which this invention is applicable include both isomerization reactions and paraffin alkylation reactions. Thus it may be used for a process involving the isomerization of a $C_5$–$C_6$ petroleum naphtha cut, for example, or a paraffin alkylation reaction involving isobutane as the lower boiling reactant and heptane, decane, octane, cetane, for example, or mixtures containing the higher paraffins, such as a heavy naphtha cut, as the higher boiling reactant. Also, as previously stated, naturally occurring naphthenes may be present, or they may be added to control the reaction. Also, naphthenes may be added to the distillation zone to minimize degradation.

The benefits of the invention will be appreciated from the results of the following tests.

EXAMPLE

Several solutions of aluminum bromide in decalin were prepared and to some of them about 50 wt. percent of isobutane was added. The various samples were held at temperatures of 80° F. in one case and 300–330° F. in another case for various periods of time and the amount of sludge formation was determined. The results obtained are shown in Table I. It will be seen that the addition of the isobutane decreased the amount of sludge formed at 80° F. by a factor of 20 to 30 and at 300 to 350° F. by a factor of 7 or 8. Even at the short holding time of ½ hour, sludging was reduced by a factor of 8. These results are indicative of the sludge formation that tends to occur when recovering aluminum bromide from solution in paraffinic hydrocarbons by distillation even in the presence of added naphthenes, which are known to be inhibitors of degradation of hydrocarbons in contact with aluminum halides. A high boiling napthene, e.g., decalin, was chosen for the tests since this would be representative of the type of material that would be present in the bottoms after lower boiling materials had been distilled off. Related tests in the recovery of aluminum bromide from solution in paraffinic hydrocarbons or from mixtures of paraffinic and naphthenic hydrocarbons indicated that sludge formation at 350° F. occurse whenever contact times exceed 30 seconds. Thus, the quenching with isobutane in accordance with the present invention is of considerable importance in any practical process involving aluminum bromide recovery by distillation.

*Table I*

| Time, (hrs.) | 24 | 24 | 24 | 24 |
|---|---|---|---|---|
| Temperature, (° F.) | 80 | 80 | 300–330 | 300–330 |
| $AlBr_3$, grams | 5 | 5 | 5 | 5 |
| Decalin, grams | 88 | 88 | 88 | 88 |
| $iC_4$, grams | 0 | 60 | 0 | 80 |
| Grams $AlBr_3$ Lost to Sludge | 1.21 | 0.05 | 4.8 | 0.7 |
| Hours | 3 | 3 | ½ | ½ |
| Temperature, (° F.) | 80 | 80 | 300–350 | 300–350 |
| $AlBr_3$, Grams | 5 | 5 | 5 | 5 |
| Decalin, Grams | 88 | 88 | 88 | 88 |
| $iC_4$, Grams | 0 | 80 | 0 | 80 |
| Grams $AlBr_3$ Lost to Sludge | 0.3 | 0.01 | 0.5 | 0.06 |

It will be understood that the specific embodiments herein described and the specific examples given are not intended to limit the invention in any manner. The scope of the invention is defined in the appended claims.

What is claimed is:

1. In the catalytic treatment of paraffinic hydrocarbons in the presence of aluminum bromide catalyst, in a reaction zone, wherein the products of the reaction comprise principally branched chain paraffin hydrocarbons of from about 4 to 7 carbon atoms, and including the steps of continuously removing from the reaction zone products containing dissolved aluminum bromide and continuously distilling overhead from said products, in a distillation zone, hydrocarbons at least as high boiling as 6-carbon-atom paraffin hydrocarbons, whereby a concentrated, liquid bottoms product consisting of aluminum bromide and higher boiling hydrocarbons is obtained, continuously removing said bottoms product from said distillation zone, and recycling at least a portion of said bottoms product to the reaction zone, the improvement which comprises quenching said concentrated bottoms product by mixing therewith a butane, immediately upon withdrawal of said bottoms product from said distillation zone, whereby sludge formation in said bottoms product is prevented.

2. Process as defined by claim 1 wherein said butane comprises isobutane.

3. Process as defined by claim 1 wherein said catalytic treatment comprises the isomerization of a paraffin hydrocarbon of from 5 to 7 carbon atoms.

4. Process as defined by claim 1 wherein said catalytic treatment comprises the reaction of a paraffinic hydrocarbon of from 6 to 18 carbon atoms with isobutane.

5. Process as defined by claim 1 wherein naphthene hydrocarbons are present in said products being distilled in said distillation zone.

6. The process as defined by claim 1 wherein the amount of the butane mixed with said bottoms product during said quenching step is at least equal in volume to the volume of said bottoms.

7. The process as defined by claim 1 wherein the amount of the butane added to said bottoms product during said quenching step is sufficient to cool the resultant mixture to a temperature less than about 150° F.

References Cited in the file of this patent

UNITED STATES PATENTS

| | | |
|---|---|---|
| 2,349,458 | Owen et al. | May 23, 1944 |
| 2,378,782 | Mason | June 19, 1945 |
| 2,412,143 | Gorin et al. | Dec. 3, 1946 |
| 2,421,524 | Ross et al. | June 3, 1947 |
| 2,464,682 | Hepp | Mar. 15, 1949 |